US012754506B2

(12) United States Patent
Nakao

(10) Patent No.: US 12,754,506 B2
(45) Date of Patent: Oct. 6, 2026

(54) SHEET FEEDING DEVICE AND IMAGE FORMING APPARATUS

(71) Applicant: KYOCERA Document Solutions Inc., Osaka (JP)

(72) Inventor: Masahiro Nakao, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 19/066,104

(22) Filed: Feb. 27, 2025

(65) Prior Publication Data

US 2025/0278048 A1 Sep. 4, 2025

(30) Foreign Application Priority Data

Feb. 29, 2024 (JP) ................................ 2024-029749

(51) Int. Cl.
*B65H 3/48* (2006.01)
*B65H 1/26* (2006.01)
*G03G 15/00* (2006.01)

(52) U.S. Cl.
CPC ......... *G03G 15/6511* (2013.01); *G03G 15/50* (2013.01); *G03G 2215/00599* (2013.01); *G03G 2215/00666* (2013.01)

(58) Field of Classification Search
CPC .......... B65H 2515/805; B65H 2515/40; B65H 2515/20; B65H 3/48; B65H 3/46; B65H 1/266; B65H 1/04; G03G 21/20; G03G 21/203; G03G 21/206; G03G 2215/00776; G03G 2215/00772; G03G 2215/00666
See application file for complete search history.

(56) References Cited

U.S. PATENT DOCUMENTS 7,938,396 B2 * 5/2011 Okumura ............. B65H 3/0607 271/130
12,043,507 B2 * 7/2024 Aono .................... F24H 15/238
2005/0053401 A1 * 3/2005 Matsumoto ........ G03G 15/6511 399/390
2007/0267803 A1 * 11/2007 Tateishi ............. G03G 15/6511 271/98
2009/0066010 A1 * 3/2009 Fukusaka ................. B65H 1/04 271/145
2020/0033800 A1 * 1/2020 Aoki .................... G03G 21/203

FOREIGN PATENT DOCUMENTS

JP 2021067780 A * 4/2021
JP 2022010479 A 1/2022

OTHER PUBLICATIONS

Translation of JP-202106770-A (Year: 2026).*

* cited by examiner

*Primary Examiner* — Luis A Gonzalez
(74) *Attorney, Agent, or Firm* — Alleman Hall LLP

(57) ABSTRACT

A sheet feeding device includes: a sheet housing unit that is mounted on a body of an apparatus such that the sheet housing unit can be pulled out of the body of the apparatus; a blowing unit that blows air toward a sheet housed in the sheet housing unit; a heating unit that heats the air blown by the blowing unit; and a control unit that controls the blowing unit and the heating unit. In the sheet feeding device, the control unit is configured to drive the blowing unit and the heating unit during a sheet feeding operation of feeding the sheet from the sheet housing unit, and continuously drive the blowing unit and stop the heating unit when the sheet housing unit is pulled out of the body of the apparatus during the sheet feeding operation.

8 Claims, 7 Drawing Sheets

SHEET FEEDING DEVICE AND IMAGE FORMING APPARATUS

INCORPORATION BY REFERENCE

This application is based upon and claims the benefit of priority from the corresponding Japanese Patent Application No. 2024-029749 filed on Feb. 29, 2024, the entire contents of which are incorporated herein by reference.

FIELD

The present disclosure relates to a sheet feeding device and an image forming apparatus including the same.

BACKGROUND

An electrophotographic image forming apparatus includes a sheet feeding device that feeds a sheet to an image forming unit. The sheet feeding device takes one sheet from a plurality of sheets stacked in a tray and feeds the taken sheet to the image forming unit. As the sheets housed in the tray, not only sheets of paper referred to as so-called plain paper but also special sheets such as so-called coated paper whose surface has been subjected to coating treatment, and the like are known. In the past, it has been difficult to separate the sheets stacked in the tray in some cases because they have been in close contact with each other, resulting in double feeding. The sheets are likely to come into close contact with each other in high humidity conditions.

In order to prevent the sheets from coming into close contact with each other, blowing warm air onto the sheets stacked in the tray has been known in the past. For example, a sheet feeder that does not blow warm air at excessive temperature onto the sheets when replacing them has been proposed.

SUMMARY

A sheet feeding device according to an aspect of the present disclosure includes: a sheet housing unit that is mounted on a body of an apparatus such that the sheet housing unit can be pulled out of the body of the apparatus; a blowing unit that blows air toward a sheet housed in the sheet housing unit; a heating unit that heats the air blown by the blowing unit; and a control unit that controls the blowing unit and the heating unit. In the sheet feeding device, the control unit is configured to drive the blowing unit and the heating unit during a sheet feeding operation of feeding the sheet from the sheet housing unit, and continuously drive the blowing unit and stop the heating unit when the sheet housing unit is pulled out of the body of the apparatus during the sheet feeding operation.

An image forming apparatus according to another aspect of the present disclosure includes: the sheet feeding device; and an image forming unit that forms an image on the sheet fed by the sheet feeding device.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

Embodiments of the present disclosure will be described below with reference to the drawings. Note that the following embodiments are merely examples embodying the present disclosure and do not limit the technical scope of the present disclosure.

Figure 1:
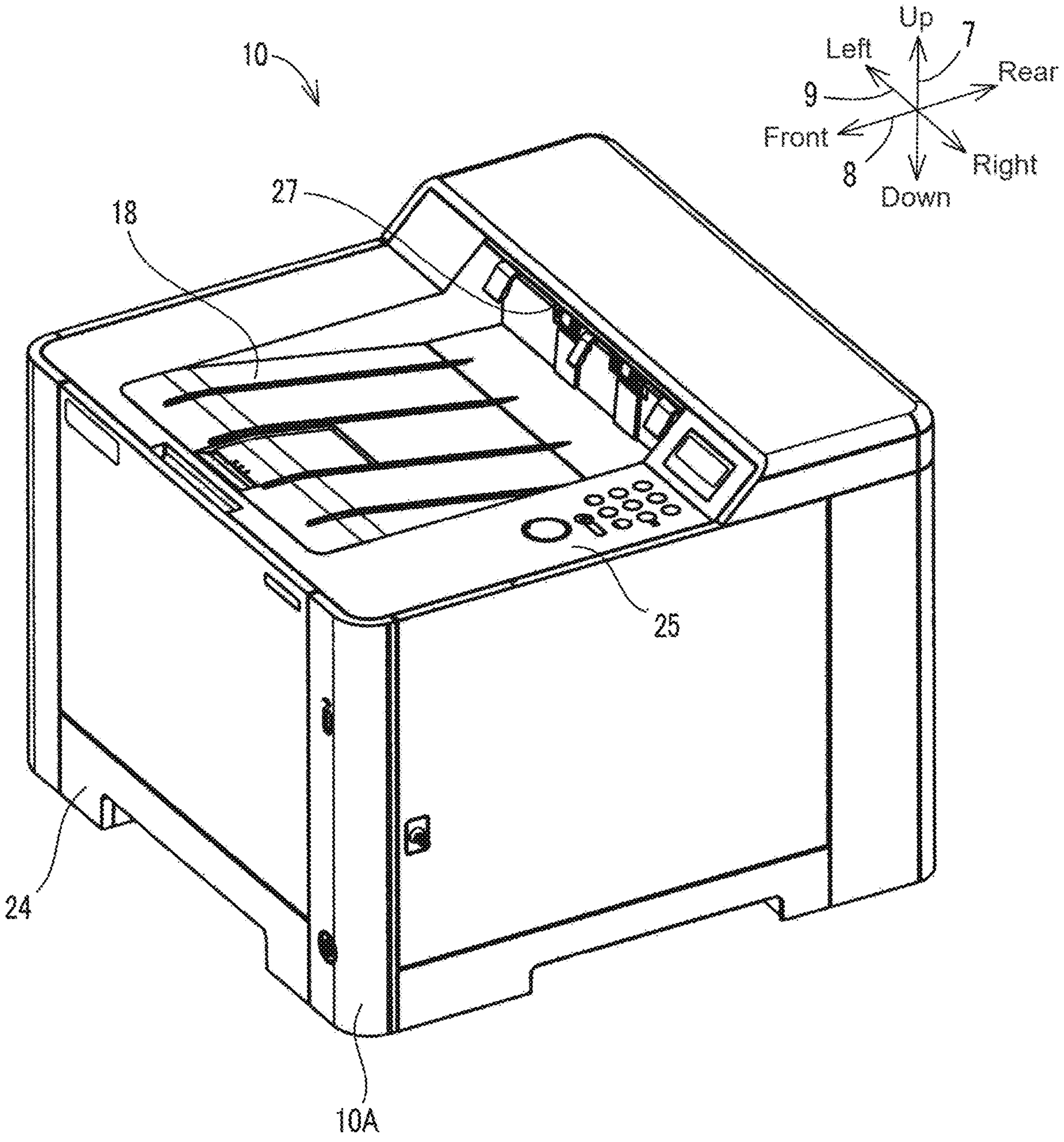
FIG. 1 is a perspective view showing a configuration of an image forming apparatus according to an embodiment of the present disclosure.

For convenience of description, the vertical direction in the installation state (shown in FIG. 1) in which an image forming apparatus 10 can be used is defined as an up-and-down direction 7. Further, a front-and-rear direction 8 is defined with the surface where a paper feed device 24 (sheet housing device) shown in FIG. 1 is inserted and removed in the installation state as the front (front surface). Further, a right-and-left direction 9 is defined on the basis of the front surface of the image forming apparatus 10 in the installation state.

The image forming apparatus 10 according to the embodiment of the present disclosure is an apparatus having at least a printing function. The image forming apparatus 10 is a color printer of a so-called tandem type. Note that the image forming apparatus 10 may be a monochrome printer.

Figure 2:
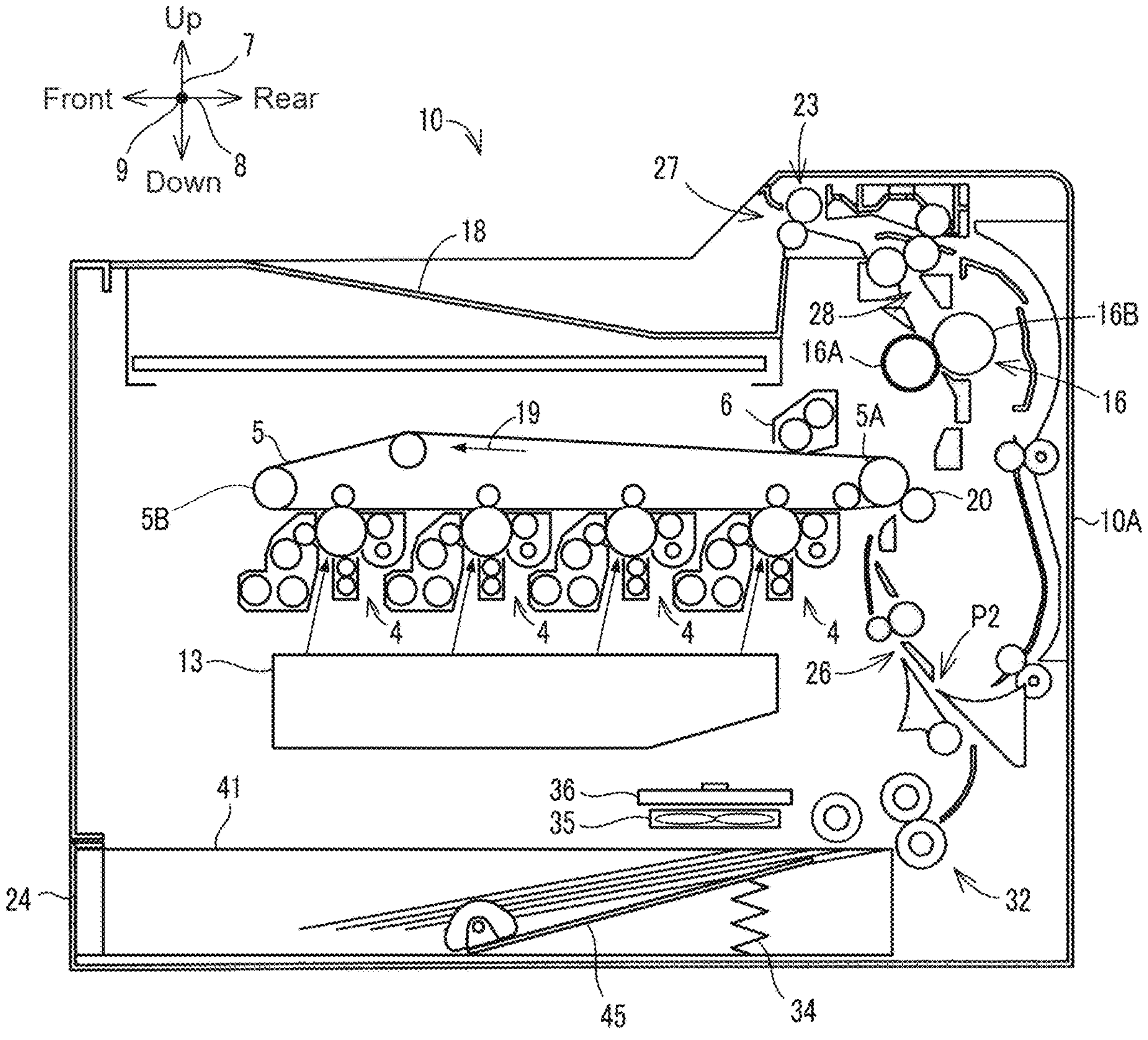
FIG. 2 is a cross-sectional view showing an internal configuration of the image forming apparatus according to the embodiment of the present disclosure.

As shown in FIG. 1 and FIG. 2, the image forming apparatus 10 includes a casing 10A (an example of the body of the apparatus according to the present disclosure). The casing 10A has a substantially rectangular parallelepiped shape as a whole. The respective units constituting the image forming apparatus 10 are disposed inside the casing 10A.

As shown in FIG. 2, the image forming apparatus 10 includes four image formation units 4, an intermediate transfer belt 5, a light scanning device 13, a secondary transfer roller 20, a fixing device 16, a sheet tray 18, the paper feed device 24, an operation display unit 25 (see FIG. 1), a belt cleaning device 6, a blower fan 35 (an example of the blowing unit according to the present disclosure), a heater 36 (an example of the heating unit according to the present disclosure), a control unit 90 (see FIG. 4), and the like. Note that the image formation unit 4, the intermediate transfer belt 5, the fixing device 16, and the secondary transfer roller 20 realize the image forming unit according to the present disclosure. Further, the image forming apparatus 10 including the paper feed device 24, the blower fan 35, and the heater 36 is an example of the sheet feeding device according to the present disclosure. Note that the sheet feeding device according to the present disclosure only needs to include at least the paper feed device 24, the blower fan 35, and the heater 36.

Each of the image formation units 4 includes a photoreceptor drum, a charging device, a development device, a primary transfer roller, and the like, and forms an image on the intermediate transfer belt 5 in accordance with an electrophotographic method. The image formation units 4 are arranged along the front-and-rear direction 8 inside the casing 10A and form color images on the basis of a so-called tandem method. The image formation units 4 transfer toner images of respective colors to the intermediate transfer belt 5 in a superimposed manner to form a color toner image on the intermediate transfer belt 5. The toner image on the intermediate transfer belt 5 is transferred to printing paper (an example of the sheet according to the present disclosure) fed from the paper feed device 24, by the secondary transfer roller 20. Note that the image formation unit 4 does not necessarily need to perform image forming processing by an electrophotographic method and may perform image forming processing by, for example, an inkjet recording method.

The intermediate transfer belt 5 is provided above the four image formation units 4. The intermediate transfer belt 5 is supported to be driven to rotate by a drive roller 5A and a driven roller 5B. By being supported by the drive roller 5A and the driven roller 5B, the intermediate transfer belt 5 is capable of moving in the direction indicated by an arrow 19 while the surface of the intermediate transfer belt 5 is in contact with the surface of each photoreceptor drum.

The light scanning device 13 is provided below the four image formation units 4. The light scanning device 13 applies laser light to each of the photoreceptor drums of the image formation units 4 on the basis of image data of each color input to form an electrostatic latent image on each photoreceptor drum.

The paper feed device 24 is provided at the bottom of the casing 10A. The paper feed device 24 includes a sheet housing unit 41 and a feeding mechanism 32. A plurality of sheets of printing paper (corresponding to the sheet according to the present disclosure) is housed in the sheet housing unit 41. A vertical conveying path 26 that extends from the paper feed device 24 to the fixing device 16 through the secondary transfer roller 20 is formed on the rear side of the casing 10A. The feeding mechanism 32 takes the printing paper stacked in the sheet housing unit 41 one sheet at a time and feeds the taken printing paper to the vertical conveying path 26.

The secondary transfer roller 20 is provided at a position facing the drive roller 5A on the rear side of the casing 10A. The secondary transfer roller 20 transfers a toner image to the printing paper from the intermediate transfer belt 5.

The fixing device 16 is provided above the secondary transfer roller 20. The fixing device 16 applies heat to printing paper to fix a toner image to the printing paper. The fixing device 16 includes a heating roller 16A and a pressure roller 16B, which are a pair of rollers. The heating roller 16A is disposed on the inner side than the pressure roller 16B, in the casing 10A. The heating roller 16A is heated by a heating device. The printing paper conveyed from the secondary transfer roller 20 to the fixing device 16 is conveyed while being sandwiched between the heating roller 16A and the pressure roller 16B. At this time, heat is transferred from the heating roller 16A to the printing paper, and the toner on the printing paper melts to be fixed to the printing paper. This forms a color image on the printing paper.

An output path 28 is formed between the fixing device 16 to a sheet output port 27. The printing paper that has passed through the fixing device 16 is conveyed through the output path 28 by an output roller 23 and is output from the sheet output port 27 to the sheet tray 18.

Figure 3:
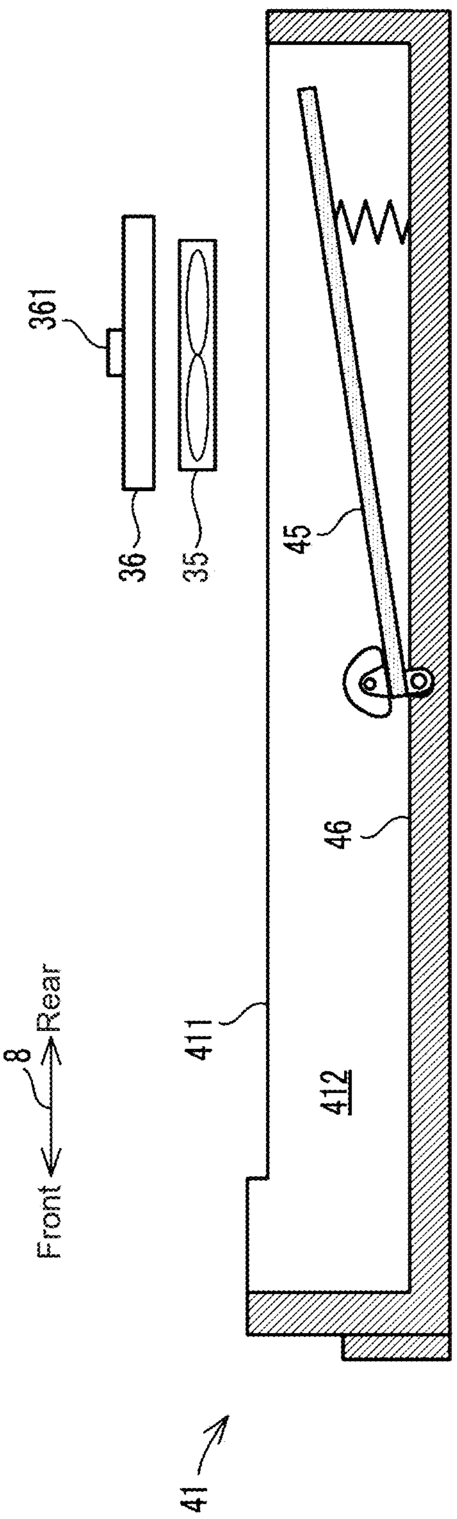
FIG. 3 is a cross-sectional view showing a configuration of a sheet housing unit included in the image forming apparatus according to the embodiment of the present disclosure.

FIG. 3 is a diagram showing the cross section of the sheet housing unit 41. The sheet housing unit 41 stacks a plurality of sheets of printing paper to be fed to the rear when forming an image. As shown in FIG. 3, the sheet housing unit 41 has an opening 411 on the upper surface thereof and is formed in a rectangular box shape or tray shape, which has a space 412 capable of housing printing paper therein. The sheet housing unit 41 houses a plurality of sheets of printing paper.

A lift plate 45 that is lifted in the up-and-down direction 7 is attached to a bottom portion 46 of the sheet housing unit 41. The lift plate 45 is provided on the rear side of the bottom portion 46. Printing paper is stacked on the lift plate 45. The front end of the lift plate 45 is rotatably supported by the bottom portion 46 of the paper feed device 24, and the rear end of the lift plate 45 is a free end. The lift plate 45 moves in the up-and-down direction 7 by receiving driving force from a motor (not shown). As a result, the lift plate 45 is lifted in the up-and-down direction 7 together with the printing paper.

The sheet housing unit 41 is mounted on the casing 10A such that it can be pulled out of the casing 10A. The sheet housing unit 41 is supported on the casing 10A such that it can be inserted and removed. The casing 10A supports the sheet housing unit 41 in a movable manner between a mounting position where it is mounted on the casing 10A and a removal position where it is removed from the mounting position.

A position detection sensor 37 (see FIG. 4) for detecting whether or not the sheet housing unit 41 is located at the mounting position is provided in the casing 10A. The position detection sensor 37 is connected to the control unit 90. In the case where the sheet housing unit 41 is located at the mounting position, the position detection sensor 37 transmits a signal indicating that the sheet housing unit 41 is mounted on the casing 10A to the control unit 90. The control unit 90 determines, on the basis of this signal, that the sheet housing unit 41 is located at the mounting position, i.e., the sheet housing unit 41 is mounted on the casing 10A. Meanwhile, in the case where the sheet housing unit 41 is not located at the mounting position, the position detection sensor 37 transmits a signal indicating that the sheet housing unit 41 is not mounted on the casing 10A to the control unit 90. The control unit 90 determines, on the basis of this signal, that the sheet housing unit 41 is not located at the mounting position, i.e., the sheet housing unit 41 is pulled out of the casing 10A.

The blower fan 35 is a blower that blows air toward and onto the sheets stacked in the sheet housing unit 41. As shown in FIG. 3, the blower fan 35 is provided above the sheet housing unit 41 of the paper feed device 24. The blower fan 35 is located at a position closer to the rear above the sheet housing unit 41. The blower fan 35 is mounted on the internal frame such as the casing 10A such that the air outlet thereof faces downward. Further, the suction port of the blower fan 35 faces upward. For this reason, when the blower fan 35 is driven, it sucks in air from above and blows the air toward the upper surface of the sheets stacked in the sheet housing unit 41. The blower fan 35 is driven and controlled by the control unit 90.

The heater 36 is a heating device for heating the sheets stacked in the sheet housing unit 41. The heater 36 is provided above the blower fan 35. The heater 36 heats the air blown by the blower fan 35. The heater 36 radiates heat downward. The air heated by the heater 36 is sucked in by the blower fan 35 and blown toward the sheets housed in the sheet housing unit 41. The heater 36 is, for example, a halogen heater or an IH heater. The heater 36 is driven and controlled by the control unit 90.

The heater 36 is provided with a temperature sensor 361 such as a thermostat and a thermocut for detecting abnormal temperatures of the heater 36. The temperature sensor 361 is specifically a thermocut as a protective circuit for protecting the heater 36 from abnormal temperatures and is connected in series with the power supply line of the heater 36. When the temperature sensor 361 detects an abnormal temperature, the power supply line is cut off to stop the power supply to the heater 36.

Incidentally, in the image forming apparatus 10 including the blower fan 35 and the heater 36, if the blower fan 35 is stopped and the heater 36 continues to heat when the sheet housing unit 41 is pulled out of the casing 10A, the following problem can arise. For example, if the entire sheet housing unit 41 is not fully pulled out, the printing paper housed in the sheet housing unit 41 is heated in a windless state. In this case, the printing paper becomes hot partially. If the sheet housing unit 41 is returned to the casing 10A as it is, there is a possibility that the temperature distribution of the printing paper becomes uneven, which has a negative effect on the image quality in the case where the printing paper is fed and an image is formed on the printing paper. Further, even in the case where printing paper is further added to the sheet housing unit 41, there is a possibility that the heat is transferred to the added printing paper, which deteriorates the image quality in the case where an image is formed on the printing paper. Further, even if no printing paper is housed in the sheet housing unit 41, the sheet housing unit 41 becomes hot partially in the case where the sheet housing unit 41 is heated in a windless state. In this case, there is a possibility that the heat of the sheet housing unit 41 is transferred to printing paper housed thereafter in the sheet housing unit 41, which has a negative effect on the image quality in the case where the printing paper is fed and an image is formed on the printing paper. Further, in the case where the heater 36 continues to heat in a windless state, there is a possibility that the temperature in the casing 10A rises suddenly, which causes the protective circuit of the temperature sensor 361 of the heater 36 to activate to cut off the power supply line of the heater 36 to stop abnormally.

On the other hand, in this embodiment, since the control unit 90 performs sheet blowing processing described below (see FIG. 5 to FIG. 7), it is possible to prevent the heater 36 from being abnormally overheated and the sheets of printing paper in the sheet housing unit 41 from coming into close contact with each other even in the case where the sheet housing unit 41 is pulled out of the casing 10A during a feeding operation of printing paper.

Control Unit 90

The control unit 90 controls the image forming apparatus 10 and drives and controls the blower fan 35 and the heater 36 to execute the sheet blowing processing described below.

Figure 4:
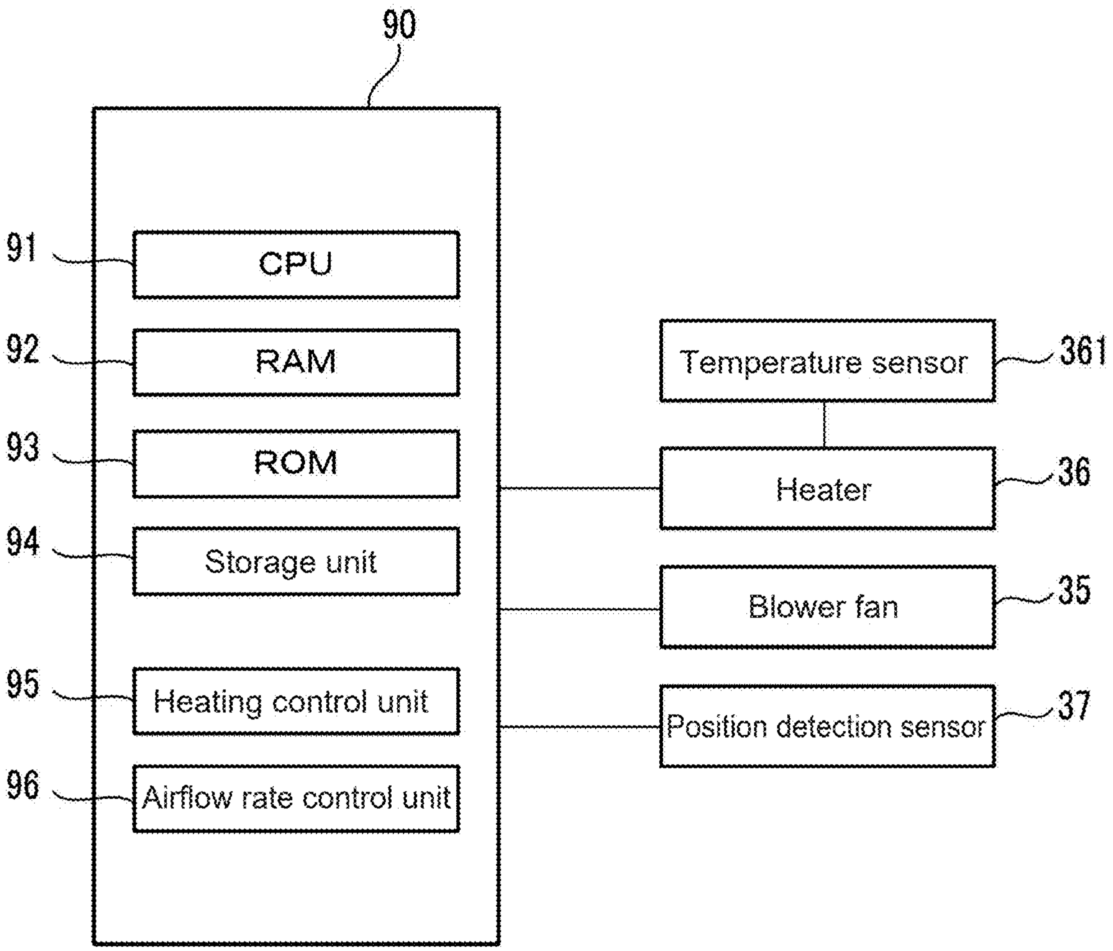
FIG. 4 is a block diagram showing a configuration of a control unit of the image forming apparatus.

As shown in FIG. 4, the control unit 90 includes a CPU 91, a RAM 92, a ROM 93, a storage unit 94, and the like. The control unit 90 is electrically connected to the blower fan 35, the heater 36, the position detection sensor 37, and the like via a signal line or the like. The blower fan 35 and the heater 36 are driven and controlled by receiving individual control signals from the control unit 90.

The CPU 91 is a processor that executes a computer program to execute various types of data processing and predetermined control. The RAM 92 is a computer-readable volatile or non-volatile storage device. The RAM 92 temporarily stores the computer program to be executed by the CPU 91, data output or referred to by the CPU 91 when executing various types of processing, and the like. The ROM 93 is a non-volatile storage device that stores, in advance, a control program such as a BIOS and an OS for causing the CPU 91 to execute various types of arithmetic processing. The storage unit 94 is a flash memory that stores various types of information. The storage unit 94 stores the control program for executing various types of processing by the control unit 90, and data, a threshold value, a reference value, and the like to be used for various types of processing. Note that the storage unit 94 may be a non-volatile storage device such as an HDD and an SSD connected to the control unit 90.

When the CPU 91 executes various control programs stored in the ROM 93 or the storage unit 94 in advance, the control unit 90 drives and controls the blower fan 35 and the heater 36 to execute the sheet blowing processing described below (see FIG. 5 to FIG. 7).

As shown in FIG. 4, in order to execute the sheet blowing processing, the control unit 90 includes various processing units such as a heating control unit 95 and an airflow rate control unit 96. Note that in this embodiment, not all of these processing units are necessarily essential and some of them can be omitted in some cases.

When the CPU 91 executes various types of arithmetic processing according to the control program, the control unit 90 functions as the various processing units. The control unit 90 or the CPU 91 is an example of the computer or processor that executes the control program. Note that some or all of the processing units included in the control unit 90 may include electronic circuits. Further, the control program may be a program for causing a plurality of processors to function as the various processing units.

The heating control unit 95 controls the driving or stopping of the heater 36. Further, the heating control unit 95 controls the output of the heater 36 by feedback control based on a comparison between the detection temperature of a temperature sensor (not shown) that detects the temperature around the sheet housing unit 41 and a predetermined target temperature.

In this embodiment, the heating control unit 95 drives the heater 36 and controls the heating by the heater 36 during a sheet feeding operation of feeding printing paper from the sheet housing unit 41 when a printing job is input in the image forming apparatus 10. Further, the heating control unit 95 stops the heater 36 when it is determined that the sheet housing unit 41 has been pulled out of the casing 10A during the sheet feeding operation.

The airflow rate control unit 96 controls the driving or stopping of the blower fan 35. Further, the airflow rate control unit 96 controls the airflow rate when the blower fan 35 blows air.

In this embodiment, the airflow rate control unit 96 drives the blower fan 35 and controls the air blowing by the blower fan 35 during the sheet feeding operation of feeding printing paper from the sheet housing unit 41 when a printing job is input in the image forming apparatus 10. Further, the airflow rate control unit 96 does not immediately stop the blower fan 35 but continues to drive the blower fan 35 when it is determined that the sheet housing unit 41 has been pulled out of the casing 10A during the sheet feeding operation.

Specifically, the airflow rate control unit 96 reduces the airflow rate of the blower fan 35 from a predetermined reference airflow rate to an airflow rate lower than the reference airflow rate in the case where the sheet housing unit 41 is pulled out of the casing 10A during the sheet feeding operation.

Further, the airflow rate control unit 96 counts the elapsed time after the heater 36 is stopped by the heating control unit 95, and stops the blower fan 35 in the case where it is determined that a predetermined set time has elapsed.

Specifically, the airflow rate control unit 96 changes the set time in accordance with the drive time during which the heater 36 is driven from the time when driving of the heater 36 started to the time when the sheet housing unit 41 was pulled out of the casing 10A during the sheet feeding operation.

For example, in the case where the sheet housing unit 41 is pulled out during the sheet feeding operation, the longer the drive time up to this point, the higher the temperature of the heated heater 36. For this reason, in this case, the longer the drive time, the airflow rate control unit 96 sets the set time to a longer time. Specifically, in the case where the drive time is longer than a predetermined reference drive time, the airflow rate control unit 96 sets, as the set time, the calculation value obtained by adding an increased value proportional to the time difference between the drive time and the reference drive time to the reference drive time. This allows the residual heat of the heater 36 to be reliably reduced and the heater 36 to be reliably cooled, while the sheet housing unit 41 is pulled out.

Further, in the case where the sheet housing unit 41 is pulled out during the sheet feeding operation, the shorter the drive time up to this point, the lower the risen temperature of the heater 36. For this reason, in this case, the shorter the drive time, the airflow rate control unit 96 sets the set time to a shorter time. Specifically, in the case where the drive time is shorter than the reference drive time, the airflow rate control unit 96 sets, as the set time, the calculation value obtained by subtracting a subtraction value proportional to the time difference between the drive time and the reference drive time from the reference drive time. This allows the residual heat of the heater 36 to be efficiently reduced and the heater 36 to be reliably cooled, while the sheet housing unit 41 is pulled out.

In another embodiment, the airflow rate control unit 96 may set, in the case where the drive time is equal to or longer than a predetermined first threshold value, the set time to a first time longer than a predetermined initial set time. In this case, the airflow rate control unit 96 maintains the set time at the initial set time in the case where the drive time is less than the first threshold value and is equal to or more than a second threshold value that is smaller than the first threshold value. Further, the airflow rate control unit 96 sets, in the case where the drive time is less than the second threshold value, the set time to a second time shorter than the initial set time. Note that the first threshold value and the second threshold value can be set arbitrarily.

Further, the airflow rate control unit 96 changes, in accordance with the drive time of the blower fan 35 and the heater 36 during the sheet feeding operation, the airflow rate of the blower fan 35 after the heater 36 is stopped.

For example, in the case where the sheet housing unit 41 is pulled out during the sheet feeding operation, the longer the drive time up to this point, the more the printing paper is dried by the blower fan 35 and the heater 36, which is sufficiently dried. For this reason, the adhesion between sheets of printing paper is low, and there is a possibility that the alignment of the sheets of printing paper becomes poor due to the wind force of the blower fan 35. In this case, the airflow rate control unit 96 reduces the airflow rate of the blower fan 35 as the drive time increases. This prevents the printing paper from being displaced due to the wind force, while the sheet housing unit 41 is pulled out.

Further, in the case where the sheet housing unit 41 is pulled out during the sheet feeding operation, it is conceivable that the shorter the drive time up to this point, the less the printing paper is dried by the blower fan 35 and the heater 36, which is insufficiently dried. For this reason, it is conceivable that the adhesion between sheets of printing paper is not reduced and the alignment of the sheets of printing paper is not affected even if the wind force of the blower fan 35 is somewhat strong. In this case, the airflow rate control unit 96 increases the airflow rate of the blower fan 35 as the drive time decreases. This allows the heater 36 to be cooled faster without disturbing the alignment of the sheets of printing paper due to the wind force, while the sheet housing unit 41 is pulled out.

In another embodiment, the airflow rate control unit 96 may set, in the case where the drive time is equal to or more than the predetermined first threshold value, the set airflow rate of the blower fan 35 to a first airflow rate lower than a predetermined initial set airflow rate. In this case, the airflow rate control unit 96 sets, in the case where the drive time is less than the first threshold value and is equal to or more than the second threshold value, the set airflow rate to a second airflow rate that is higher than the first airflow rate and lower than the initial set airflow rate. Further, the airflow rate control unit 96 sets, in the case where the drive time is less than the second threshold value, the set airflow rate to the initial set airflow rate or a third airflow rate that is higher than the second airflow rate and lower than the initial set airflow rate.

First Processing Example of Sheet Blowing Processing

An example (first processing example) of the procedure of sheet blowing processing executed by the control unit 90 and a blowing control method according to the present disclosure will be described below with reference to FIG. 5. In FIG. 5, S11, S12, . . . indicate the numbers (Step numbers) of the processing procedure.

Note that one or a plurality of Steps included in the sheet blowing processing described below may be omitted as appropriate. Further, the order of execution of Steps in the sheet blowing processing may differ as long as the same operation and effect are achieved. Further, although a case where one processor corresponding to the control unit 90 executes the processing of each Step in the sheet blowing processing will be described below as an example, a plurality of processors may execute the respective Steps in the sheet blowing processing in a distributed manner.

The sheet blowing processing described below is executed in the case where a printing job for printing an image on printing paper in the sheet housing unit 41 has been input to the image forming apparatus 10 while the sheet housing unit 41 is mounted on the casing 10A.

Figure 5:
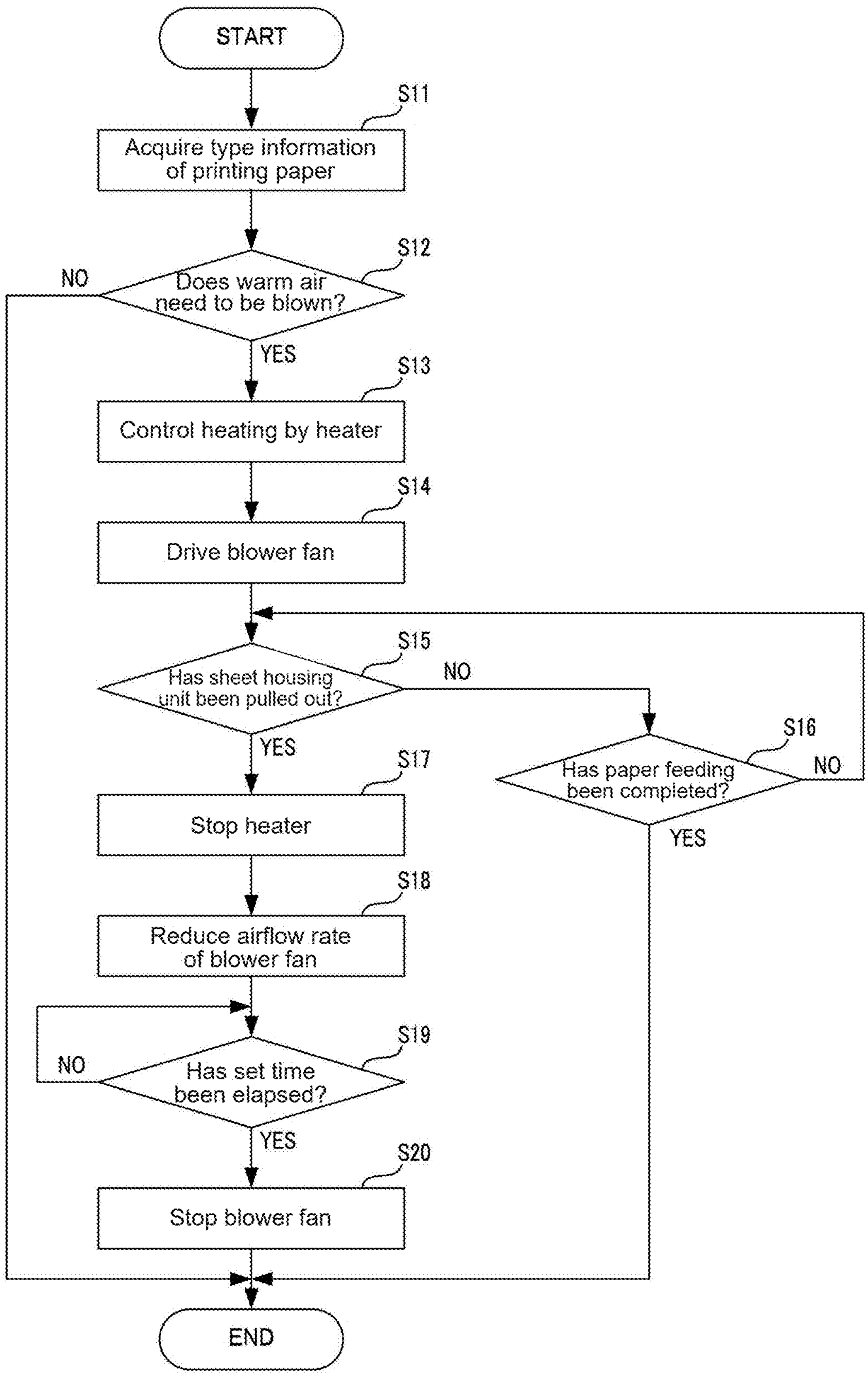
FIG. 5 is a flowchart showing a first processing example of the procedure of sheet blowing processing executed by the control unit of the image forming apparatus.

As shown in FIG. 5, in Step S11, the control unit 90 acquires type information of the printing paper to be used for the image forming processing. The type information is information indicating the type of printing paper. The possible type of printing paper is, for example, a type identified by various factors such as the basis weight of printing paper, the thickness of printing paper, the presence or absence of coating treatment in printing paper, and the thickness of a coat layer. Specific examples thereof include so-called plain paper that has not been subjected to coating treatment and so-called coated paper that has been subjected to coating treatment.

For example, sheet-of-paper information including the type information of printing paper housed in the sheet housing unit 41 is stored in the storage unit 94 of the control unit 90, the control unit 90 acquires the type information of printing paper on which an image is to be formed from the storage unit 94 and determines the type of printing paper in the sheet housing unit 41.

In the next Step S12, the control unit 90 determines, on the basis of the acquired type information, whether or not warm air needs to be blown onto the printing paper in the sheet housing unit 41. Specifically, the control unit 90 determines, in the case where the printing paper housed in the sheet housing unit 41 is coated paper, that warm air needs to be blown and determines, in the case where the printing paper is plain paper, that warm air does not need to be blown. In the case where it is determined that warm air does not need to be blown, the series of processing ends.

In the case where it is determined in Step S12 that warm air needs to be blown, the control unit 90 drives the heater 36 to start controlling the heating by the heater 36 (S13). Further, the control unit 90 drives the blower fan 35 to start blowing by the blower fan 35. As a result, warm air is blown onto the printing paper housed in the sheet housing unit 41 (S14).

In Step S15, the control unit 90 determines whether or not the sheet housing unit 41 has been pulled out of the casing 10A. In the case where the sheet housing unit 41 has remained mounted on the casing 10A, the series of processing ends under the condition that all paper feeding corresponding to the printing job has been completed after that (S16).

Meanwhile, in the case where it is determined in Step S15 that the sheet housing unit 41 has been pulled out of the casing 10A, the control unit 90 stops the heater 36 (S17) and reduces the airflow rate of the blower fan 35 (S18). Note that the degree of reduction in airflow rate can be the airflow rate obtained by multiplying the initial set airflow rate by a predetermined reduction rate (e.g., 50%).

After that, the control unit 90 determines whether or not the elapsed time after the heater 36 is stopped has elapsed the set time (S19), and stops the blower fan 35 in the case where the elapsed time has elapsed the set time (S20).

As described above, in the case where the sheet housing unit 41 is pulled out of the casing 10A during the sheet feeding operation, the blower fan 35 is continuously driven and the heater 36 is stopped. Therefore, it is possible to prevent the heater 36 from being abnormally overheated and the sheets of printing paper in the sheet housing unit 41 from coming into close contact with each other.

Note that although the airflow rate of the blower fan 35 is reduced after the heater 36 is stopped in the above-mentioned first processing example, for example, the blower fan 35 may continue to blow at the initial set airflow rate without reducing the airflow rate of the blower fan 35.

Second Processing Example of Sheet Blowing Processing

An example (second processing example) of the procedure of sheet blowing processing executed by the control unit 90 will be described below with reference to FIG. 6. Note that the procedure of the same processing content as that of the above-mentioned first processing example is indicated by the same Step number, and detailed description thereof is omitted.

Figure 6:
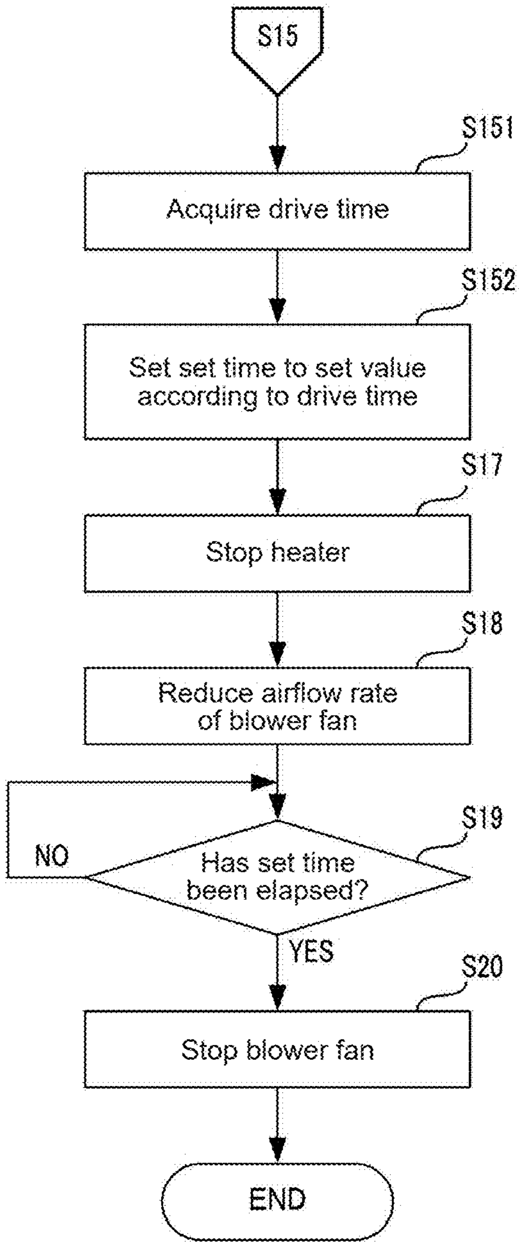
FIG. 6 is a flowchart showing a second processing example of the procedure of the sheet blowing processing executed by the control unit of the image forming apparatus.

As shown in FIG. 6, when it is determined in Step S15 that the sheet housing unit 41 has been pulled out, the control unit 90 acquires the drive time during which the heater 36 is driven from the time when driving of the heater 36 started to the time when the sheet housing unit 41 was pulled out of the casing 10A during the sheet feeding operation (S151). The control unit 90 counts, as the drive time, the time from the time point at which driving of the heater 36 started after the input of the printing job to the time point at which the sheet housing unit 41 is pulled out.

In the next Step S152, the control unit 90 changes the set time in accordance with the drive time. That is, the control unit 90 sets the set time to a set value according to the drive time. After that, the above-mentioned processing of Step S17 and subsequent Steps is executed.

Even in such a second processing example, it is possible to prevent the heater 36 from being abnormally overheated and the sheets of printing paper in the sheet housing unit 41 from coming into close contact with each other.

Third Processing Example of Sheet Blowing Processing

An example (third processing example) of the procedure of sheet blowing processing executed by the control unit 90 will be described below with reference to FIG. 7. Note that the procedure of the same processing content as those of the above-mentioned first processing example and second processing example is indicated by the same Step number, and detailed description thereof is omitted.

Figure 7:
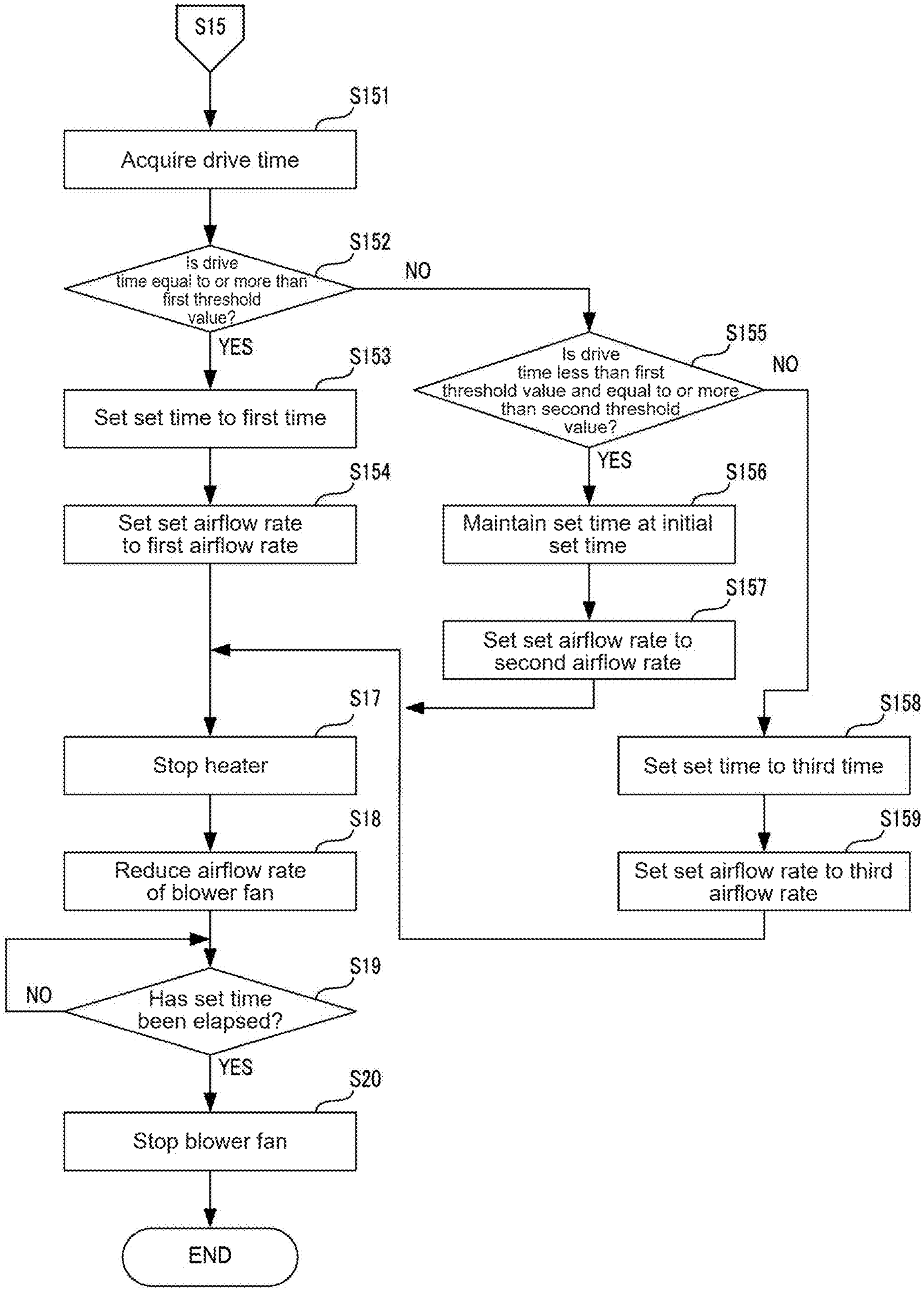
FIG. 7 is a flowchart showing a third processing example of the procedure of the sheet blowing processing executed by the control unit of the image forming apparatus.

As shown in FIG. 7, when it is determined in Step S15 that the sheet housing unit 41 has been pulled out, the control unit 90 acquires the drive time.

In the next Step S152, the control unit 90 determines whether or not the drive time is equal to or more than the first threshold value. The processing of the control unit 90 proceeds to Step S153 in the case where the drive time is equal to or more than the first threshold value and proceeds to Step S155 in the case where the drive time is less than the first threshold value.

In Step S153, the control unit 90 sets the set time to be used in Step S19 to a first time longer than a predetermined initial set time. Further, in Step S154, the control unit 90 sets the set airflow rate of the blower fan 35 to the first airflow rate lower than the predetermined initial set airflow rate. After that, the above-mentioned processing of Step S17 and subsequent Steps is executed.

In Step S155, the control unit 90 determines whether or not the drive time is less than the first threshold value and equal to or more than the second threshold value. The processing of the control unit 90 proceeds to Step S156 in the case where the drive time is less than the first threshold value and equal to or more than the second threshold value and proceeds to Step S158 in the case where the drive time is less than the second threshold value.

In Step S156, the control unit 90 maintains the set time to be used in Step S19 at the initial set time. Further, in Step S157, the control unit 90 sets the set airflow rate of the blower fan 35 to the second airflow rate that is higher than the first airflow rate and lower than the initial set airflow rate. After that, the above-mentioned processing of Step S17 and subsequent Steps is executed.

Further, in Step S158, the control unit 90 sets the set time to the second time shorter than the initial set time. Further, the control unit 90 sets the set airflow rate to the initial set airflow rate or the third airflow rate that is higher than the second airflow rate and lower than the initial set airflow rate. After that the above-mentioned processing of Step S17 and subsequent Steps is executed.

Even in such a third processing example, it is possible to prevent the heater 36 from being abnormally overheated and the sheets of printing paper in the sheet housing unit 41 from coming into close contact with each other.

Notes of Invention

The outline of the invention extracted from the above-mentioned embodiments will be given below. Note that the configurations and processing functions described in the following notes can be arbitrarily selected and combined.

<Note 1>

A sheet feeding device, including:

a sheet housing unit that is mounted on a body of an apparatus such that the sheet housing unit can be pulled out of the body of the apparatus;

a blowing unit that blows air toward a sheet housed in the sheet housing unit;

a heating unit that heats the air blown by the blowing unit; and a control unit that controls the blowing unit and the heating unit, the control unit being configured to drive the blowing unit and the heating unit during a sheet feeding operation of feeding the sheet from the sheet housing unit, and continuously drive the blowing unit and stop the heating unit when the sheet housing unit is pulled out of the body of the apparatus during the sheet feeding operation.

<Note 2>

The sheet feeding device according to Note 2, in which the control unit is further configured to reduce an airflow rate of the blowing unit from a reference airflow rate to an airflow rate lower than the reference airflow rate when the sheet housing unit is pulled out of the body of the apparatus during the sheet feeding operation.

<Note 3>

The sheet feeding device according to Note 1 or 2, in which the control unit is further configured to stop the blowing unit when a predetermined set time has elapsed after the heating unit is stopped.

<Note 4>

The sheet feeding device according to Note 3, in which the control unit is further configured to change the set time in accordance with a drive time of the heating unit until the sheet housing unit is pulled out of the body of the apparatus.

<Note 5>

The sheet feeding device according to Note 4, in which the control unit is further configured to increase the set time as the drive time increases and decreases the set time as the drive time decreases.

<Note 6>

The sheet feeding device according to Note 5, in which the control unit is further configured to set, where the drive time is equal to or more than a predetermined first threshold value, the set time to a first time longer than an initial set time, maintain, where the drive time is less than the first threshold value and equal to or more than a second threshold value that is smaller than the first threshold value, the set time at the initial set time, and set, where the drive time is less than the second threshold value, the set time to a second time shorter than the initial set time.

<Note 7>

The sheet feeding device according to any one of Notes 1 to 6, in which the control unit is further configured to change, in accordance with a drive time of the heating unit until the sheet housing unit is pulled out of the body of the apparatus, an airflow rate of the blowing unit after the heating unit is stopped.

<Note 8>

The sheet feeding device according to Note 7, in which the control unit is further configured to set, where the drive time is equal to or more than a predetermined first threshold value, a set airflow rate of the blowing unit to a first airflow rate lower than an initial set airflow rate, set, where the drive time is less than the first threshold value and equal to or more than a second threshold value that is smaller than the first threshold value, the set airflow rate to a second airflow rate that is higher than the first airflow rate and lower than the initial set airflow rate, and set, where the drive time is less than the second threshold value, the set airflow rate to the initial set airflow rate or a third airflow rate that is higher than the second airflow rate and lower than the initial set airflow rate.

<Note 9>

An image forming apparatus, including:

the sheet feeding device according to any one of Notes 1 to 8; and an image forming unit that forms an image on the sheet fed by the sheet feeding device.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

The invention claimed is:

1. A sheet feeding device, comprising:

a sheet housing unit that is mounted on a body of an apparatus such that the sheet housing unit can be pulled out of the body of the apparatus;

a blowing unit that blows air toward a sheet housed in the sheet housing unit;

a heating unit that heats the air blown by the blowing unit; and a control unit that controls the blowing unit and the heating unit, wherein the control unit is configured to:

drive the blowing unit and the heating unit during a sheet feeding operation of feeding the sheet from the sheet housing unit;

continuously drive the blowing unit and stop the heating unit when the sheet housing unit is pulled out of the body of the apparatus during the sheet feeding operation; and reduce an airflow rate of the blowing unit from a reference airflow rate to an airflow rate lower than the reference airflow rate when the sheet housing unit is pulled out of the body of the apparatus during the sheet feeding operation.

2. A sheet feeding device, comprising:

a sheet housing unit that is mounted on a body of an apparatus such that the sheet housing unit can be pulled out of the body of the apparatus;

a blowing unit that blows air toward a sheet housed in the sheet housing unit;

a heating unit that heats the air blown by the blowing unit; and a control unit that controls the blowing unit and the heating unit, wherein the control unit is configured to:

drive the blowing unit and the heating unit during a sheet feeding operation of feeding the sheet from the sheet housing unit;

continuously drive the blowing unit and stop the heating unit when the sheet housing unit is pulled out of the body of the apparatus during the sheet feeding operation; and stop the blowing unit when a predetermined set time has elapsed after the heating unit is stopped.

3. The sheet feeding device according to claim 2, wherein the control unit is further configured to change the set time in accordance with a drive time of the heating unit until the sheet housing unit is pulled out of the body of the apparatus.

4. The sheet feeding device according to claim 3, wherein the control unit is further configured to increase the set time as the drive time increases and decreases the set time as the drive time decreases.

5. The sheet feeding device according to claim 4, wherein the control unit is further configured to:

set, where the drive time is equal to or more than a predetermined first threshold value, the set time to a first time longer than an initial set time;

maintain, where the drive time is less than the first threshold value and equal to or more than a second threshold value that is smaller than the first threshold value, the set time at the initial set time; and set, where the drive time is less than the second threshold value, the set time to a second time shorter than the initial set time.

6. A sheet feeding device, comprising:

a sheet housing unit that is mounted on a body of an apparatus such that the sheet housing unit can be pulled out of the body of the apparatus;

a blowing unit that blows air toward a sheet housed in the sheet housing unit;

a heating unit that heats the air blown by the blowing unit; and a control unit that controls the blowing unit and the heating unit, wherein the control unit is configured to:

drive the blowing unit and the heating unit during a sheet feeding operation of feeding the sheet from the sheet housing unit;

continuously drive the blowing unit and stop the heating unit when the sheet housing unit is pulled out of the body of the apparatus during the sheet feeding operation; and change, in accordance with a drive time of the heating unit until the sheet housing unit is pulled out of the body of the apparatus, an airflow rate of the blowing unit after the heating unit is stopped.

7. The sheet feeding device according to claim 6, wherein the control unit is further configured to:

set, where the drive time is equal to or more than a predetermined first threshold value, a set airflow rate of the blowing unit to a first airflow rate lower than an initial set airflow rate;

set, where the drive time is less than the first threshold value and equal to or more than a second threshold value that is smaller than the first threshold value, the set airflow rate to a second airflow rate that is higher than the first airflow rate and lower than the initial set airflow rate; and set, where the drive time is less than the second threshold value, the set airflow rate to the initial set airflow rate or a third airflow rate that is higher than the second airflow rate and lower than the initial set airflow rate.

8. An image forming apparatus, comprising:

a sheet feeding device comprising:

a sheet housing unit that is mounted on a body of the image forming apparatus such that the sheet housing unit can be pulled out of the body of the image forming apparatus;

a blowing unit that blows air toward a sheet housed in the sheet housing unit;

a heating unit that heats the air blown by the blowing unit; and a control unit that controls the blowing unit and the heating unit; and an image forming unit that forms an image on the sheet fed by the sheet feeding device, wherein the control unit is configured to:

drive the blowing unit and the heating unit during a sheet feeding operation of feeding the sheet from the sheet housing unit;

continuously drive the blowing unit and stop the heating unit when the sheet housing unit is pulled out of the body of the apparatus during the sheet feeding operation; and reduce an airflow rate of the blowing unit from a reference airflow rate to an airflow rate lower than the reference airflow rate when the sheet housing unit is pulled out of the body of the apparatus during the sheet feeding operation.

* * * * *